Patented Apr. 16, 1929.

1,709,542

UNITED STATES PATENT OFFICE.

JOHN D. RAYMOND, OF DETROIT, MICHIGAN.

SOLDER FLUX.

No Drawing.   Application filed May 7, 1928.   Serial No. 275,978.

My invention relates to a new and useful improvement in a solder flux and has for its object the provision of a solder flux which will be efficient in use on soft and hard metals such as zinc, tin and lead, so as to obviate the necessity of two kinds of flux for soldering purposes.

Another object of the invention is the provision of a solder flux in the use of which corrosion is avoided and which gives a bright, clear appearance to the soldered parts.

Another object of the invention is the provision of an easy and smooth flowing flux and one which will penetrate in the interstices of the work piece operated upon so that a solid joint may be effected.

The invention consists of substantially the following ingredients, to wit:

| | Parts. |
|---|---|
| Muriatic or hydrochloric acid | 3 |
| Oleic acid | 2 |
| Powdered rosin | 2 |
| Sodium chloride | 1 |

I have found that muriatic acid is more desirable for use but the hydrochloric acid will serve the purpose and in the claims attached hereto, the term "muriatic acid" where used is intended to indicate hydrochloric acid.

In mixing the composition, the rosin and salt are thoroughly mixed together and the muriatic or hydrochloric acid is then added and the whole thoroughly mixed. When the salt and the rosin and the muriatic acid are added together, the acid is thickened and is then prepared for mixing with the oleic acid which appears to emulsify the mixture. The combination of acids makes the flux operative for use on soft and hard metals and it has been experienced that a flux embodying only one of the acids can be used on solely a hard or a soft metal.

The presence of the oleic acid lends to the composition an oily characteristic thus rendering the flux efficient for use on soft metal and serving to conduct the solder into crevices between the joints to be soldered thus eliminating the formation of a bridge while the soldering operation is taking place. The acids also prevent corrosion and the presence of the salt renders the device most efficient for securing the solder to the metal.

The flux thus made is cheap to manufacture and easily handled.

If desired, a deodorant such as a small amount of wintergreen may be added to the composition.

While I have illustrated and described the preferred composition, I do not wish to limit myself to the exact details herein set out but desire to avail myself of such variations as come within the scope of the appended claim.

What I claim is:

A solder flux of the class described, consisting of muriatic acid 3 parts, oleic acid two parts, powdered rosin two parts, sodium chloride one part.

In testimony whereof I have signed the foregoing specification.

JOHN D. RAYMOND.